US011994205B1

(12) United States Patent
Powell et al.

(10) Patent No.: US 11,994,205 B1
(45) Date of Patent: May 28, 2024

(54) INTEGRATED GEAR OIL SHROUD AND PUMP OIL PICKUP

(71) Applicant: Dana Automotive Systems Group, LLC, Maumee, OH (US)

(72) Inventors: Benjamin Powell, Austin, TX (US); Ryan D. Nelms, Weatherford, TX (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/172,195

(22) Filed: Feb. 21, 2023

(51) Int. Cl.
*F16H 57/04* (2010.01)

(52) U.S. Cl.
CPC ..... *F16H 57/0423* (2013.01); *F16H 57/0404* (2013.01); *F16H 57/0409* (2013.01); *F16H 57/0436* (2013.01)

(58) Field of Classification Search
CPC ............. F16H 57/0423; F16H 57/0404; F16H 57/0409; F16H 57/0436
See application file for complete search history.

(56) References Cited

U.S. PATENT DOCUMENTS

| | | | | |
|---|---|---|---|---|
| 3,736,812 A | * | 6/1973 | Wellauer | F16H 57/0493 |
| | | | | 165/104.34 |
| 6,539,912 B1 | * | 4/2003 | Beer | F01M 11/0004 |
| | | | | 123/196 R |
| 7,213,682 B2 | * | 5/2007 | Gibson | F16H 57/0421 |
| | | | | 184/6.12 |
| 7,963,186 B2 | * | 6/2011 | Hayes | F16H 57/0421 |
| | | | | 184/6.12 |
| 8,739,930 B2 | * | 6/2014 | Bonning | F16H 57/0436 |
| | | | | 184/6.12 |
| 8,931,596 B2 | * | 1/2015 | Shioiri | F16H 57/0423 |
| | | | | 184/6.12 |
| 8,991,557 B2 | * | 3/2015 | Arisawa | F02C 7/32 |
| | | | | 184/6.12 |
| 9,309,958 B2 | * | 4/2016 | Tanaka | F16H 57/0421 |
| 9,568,091 B2 | * | 2/2017 | Drill | F16H 57/0473 |
| 10,208,848 B2 | * | 2/2019 | Hotait | F16H 57/0463 |
| 10,330,189 B2 | * | 6/2019 | Drill | F16H 57/045 |
| 11,149,837 B2 | * | 10/2021 | Lemmers, Jr. | F16H 57/0424 |
| 2011/0240149 A1 | * | 10/2011 | Tsunematsu | F16H 57/0404 |
| | | | | 137/544 |
| 2013/0180803 A1 | * | 7/2013 | Tanaka | F16H 57/0423 |
| | | | | 184/6.12 |
| 2018/0149260 A1 | * | 5/2018 | Singh | F16H 57/0423 |
| 2018/0259060 A1 | * | 9/2018 | Poster | F16H 57/0457 |
| 2020/0017987 A1 | * | 1/2020 | Poster | B64C 27/14 |

* cited by examiner

*Primary Examiner* — Michael A Riegelman
(74) *Attorney, Agent, or Firm* — McCoy Russell LLP

(57) ABSTRACT

Systems are provided for an integrated oil shroud and pump oil pickup. In some examples, an assembly may include an oil shroud element configured to enclose a lower portion of at least one rotating gear of a gearbox, and an oil intake element with an oil filter and an oil outlet configured to couple to a pump of an oil recirculating circuit, where the oil intake element is in face-sharing contact with the oil shroud element.

20 Claims, 6 Drawing Sheets

INTEGRATED GEAR OIL SHROUD AND PUMP OIL PICKUP

TECHNICAL FIELD

The present description relates generally to a drive unit assembly in a vehicle. More specifically, the present disclosure relates to a drive unit assembly with lubricant shrouding and lubricant pickup features.

BACKGROUND AND SUMMARY

Various drive train systems are used in order to transmit an amount of rotational power generated by a source of rotational power to one or more driven components. For example, the source of rotational power may be an engine or motor that generates an amount of rotational power needed to drive one or more wheel assemblies. Typically, a vehicle drive train includes one or more drive unit assemblies that transmit an amount of the rotational power generated by the engine to the one or more wheel assemblies of the vehicle. A conventional drive unit assembly includes one or more gears meshed together within a housing. In order to increase the overall life and durability of the drive unit assemblies, an amount of lubrication fluid (e.g., oil) is included within the housing to lubricate the gears of the drive unit assemblies. Conventional drive unit assemblies may suffer from various parasitic and/or churning losses that result from the resistance offered by the gears rotating through the lubrication fluid. This reduces the overall efficiency of the drive unit assemblies and reduces the amount of rotational power that is transmitted from the engine to the wheels of the vehicle.

Other attempts to address lubrication churning losses include shrouding at least one of the gears of the drive unit assembly from excess lubrication fluid. One example approach is shown by Tanaka et al. in U.S. Pat. No. 9,309,958. Therein, a lubricant shroud is configured to cover a gear train within a housing. The housing includes a draw out port that leads discharged lubrication fluid to a passage set outside of the housing before being pumped through a lubrication fluid recirculating circuit.

However, the inventors herein have recognized potential issues with such systems. A drive unit assembly that includes a shrouding element within a housing and a pump lubrication fluid (e.g., oil) pickup element outside of the housing may demand a large vertical packaging space. A large required vertical packaging space at the bottom of a drive unit assembly may reduce the ground clearance of the vehicle in which the drive unit assembly is positioned. Simply moving the pump oil pickup element into the drive unit assembly housing may not reduce the required vertical packaging space, as the housing may have to be made larger to accommodate both a shrouding element and a pump oil pickup element.

In one example, the issues described above may be addressed by an assembly comprising an oil shroud element configured to enclose a lower portion of at least one rotating gear of a gearbox, and an oil intake element with an oil filter and an oil outlet configured to couple to a pump of an oil recirculating circuit, where the oil intake element is in face-sharing contact with the oil shroud element. In this way, the oil shroud element and oil intake element may be combined into a single component configured to be positioned vertically below the rotating gears of a drive unit assembly, with the gears, the oil shrouding element, an oil pickup of the oil intake element, and the oil outlet of the oil intake element all laterally aligned along a common axis. By combining the oil shrouding element and the oil intake element into a single/shared component, the oil shrouding element may provide structural aspects to facilitate packaging of the oil intake element into existing space in the drive unit assembly housing while maintaining suitable clearance above the bottom inner surface of the housing to allow oil pickup. For example, the bottom surface of the oil shrouding element may form a portion of the top of the oil intake element and may support a cantilevered oil pickup to allow oil pickup at a center of the housing. In doing so, the required vertical packaging space of the drive unit assembly may be reduced while maintaining adequate clearances within the housing of the drive unit assembly. Further, by positioning the oil shrouding element, the oil pickup, and the oil outlet of the oil intake element along the common lateral axis, the lateral space taken up by the oil shrouding element and oil intake element may be minimized to facilitate incorporation into the housing of the drive unit assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
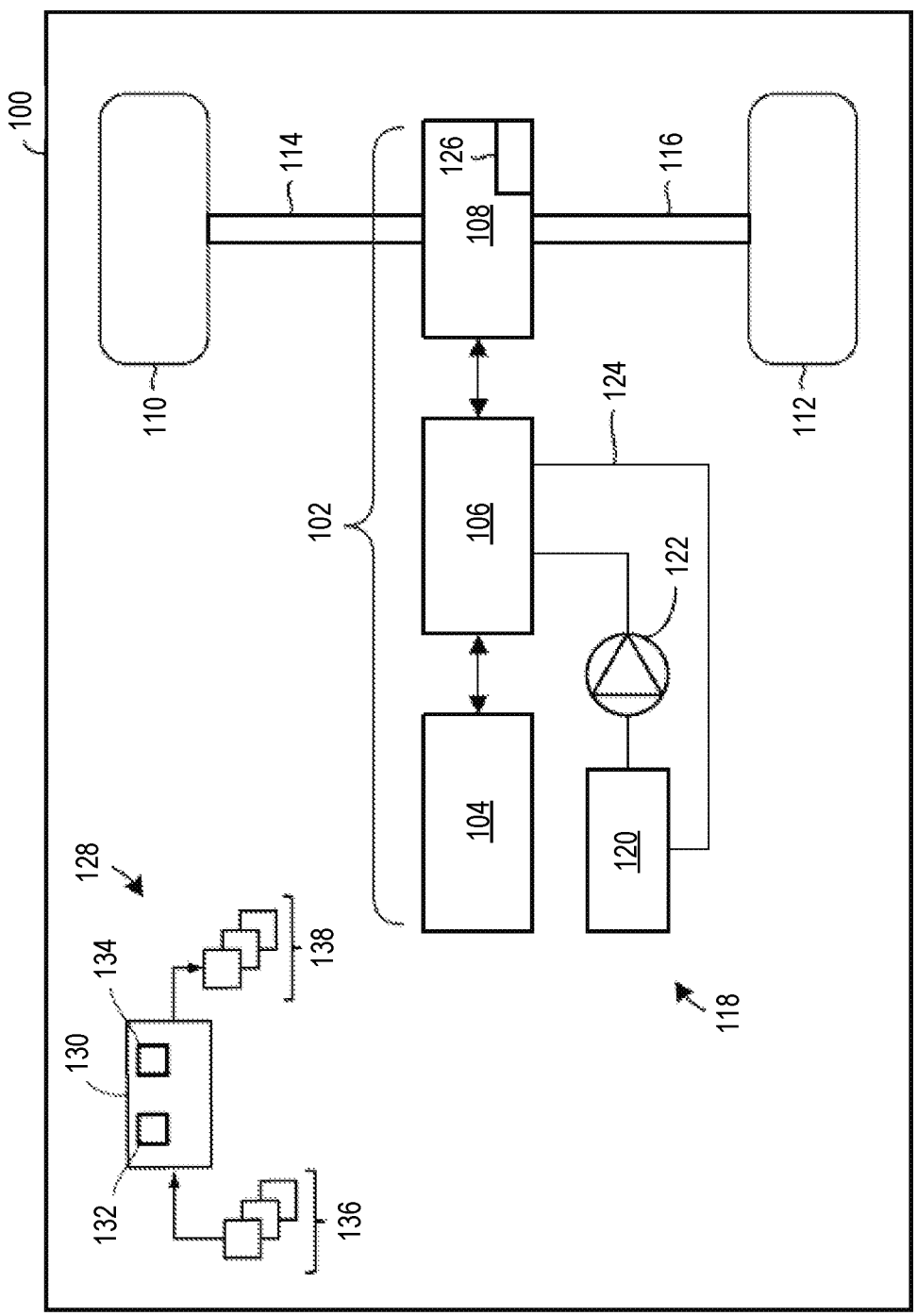
FIG. 1 is a schematic representation of a vehicle powertrain.
Figure 2:
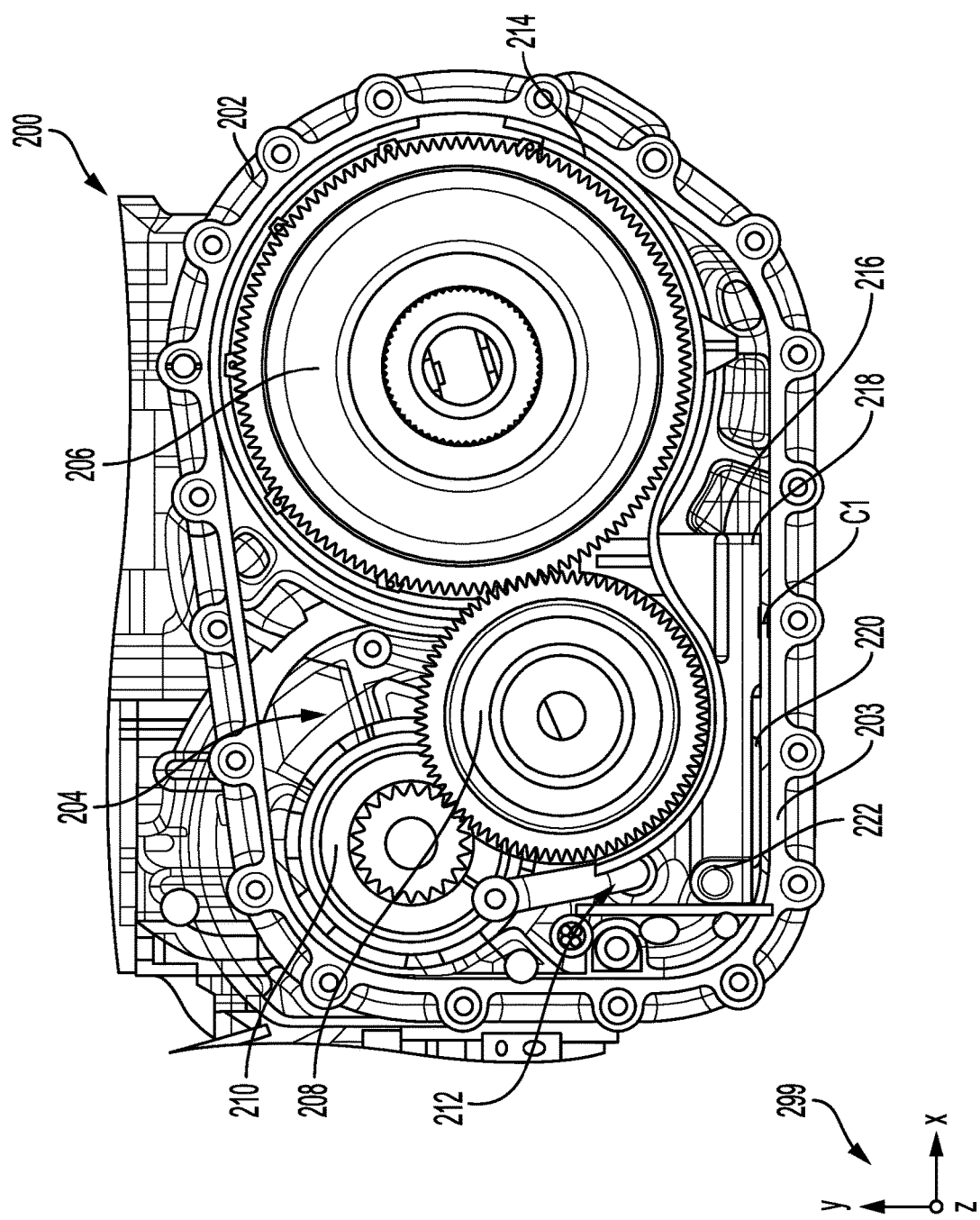
FIG. 2 is an example gearbox with an integrated oil shroud and pump oil pickup.

The following description relates to a drive unit assembly with a single component providing oil shrouding features and pump oil pickup features. FIG. 1 depicts a vehicle with a drivetrain that includes a drive unit assembly and a lubrication system for supplying lubricant to the drive unit assembly to decrease component wear. FIG. 2 shows an example drive unit assembly with an integrated oil shroud and pump oil pickup positioned near the bottom of the drive unit assembly housing. FIGS. 3-6 show different views of the integrated oil shroud and pump oil pickup from FIG. 2. FIGS. 2-6 are shown to scale, though other relative dimensions may be used.

FIG. 1 schematically illustrates a vehicle 100 with a powertrain 102 according to the present disclosure. The vehicle 100 may take a variety of forms in different embodiments such as a light, medium, or heavy duty vehicle. To generate power, the powertrain 102 may comprise a motive power source 104. The motive power source 104 may include an internal combustion engine, electric motor, combinations thereof, or other suitable device designed to generate rotational energy. The internal combustion engine may include conventional components such as cylinder(s), piston (s), valves, a fuel delivery system, an intake system, an exhaust system, etc. Further, the electric motor may include conventional components such as a rotor, a stator, a housing, and the like for generating mechanical power as well as electrical power during a regeneration mode, in some cases. As such, the powertrain 102 may be utilized in a hybrid or electric vehicle (e.g., battery electric vehicle). Therefore, the powertrain 102 may have a parallel, a series, or a series-parallel hybrid configuration, in certain instances. In other examples, however, the vehicle 100 may solely use an internal combustion engine for power generation.

The motive power source 104 may provide mechanical power to the differential 108 via a transmission 106. The power path may continue through the differential 108 to a first drive wheel 110 and a second drive wheel 112 by way of a first axle shaft 114 and a second axle shaft 116, respectively. As such, the differential 108 may distribute rotational driving force, received from the transmission 106, to the first drive wheel 110 and the second drive wheel 112 of the first axle shaft 114 and the second axle shaft 116, respectively, during certain operating conditions.

The transmission 106 may have a gear reduction that provides a speed-torque conversion functionality. To elaborate, the transmission 106 may be a gearbox capable of shifting, a continuously variable transmission, an infinitely variable transmission, and the like. The transmission 106 may make use of mechanical components such as shafts, gears, bearings and the like to accomplish the aforementioned gear reduction functionality.

The differential 108 may be designed to permit speed deviation between the axle shafts during certain conditions, such as cornering. However, to increase vehicle traction, the differential 108 may be a limited slip differential designed to constrain speed deviation between the first axle shaft 114 and the second axle shaft 116 during certain conditions. To accomplish this speed constraint functionality, the differential 108 may include a case, sets of pinion gears, and side gears.

FIG. 1 further shows a lubrication system 118 designed to supply lubricant (e.g., natural and/or synthetic oil) to components of the transmission 106. In one example, to carry out the lubricant distribution, the lubrication system 118 may include a reservoir 120 (e.g., a sump), a pump 122 for driving lubricant flow through the system, a plurality of conduit 124, and/or other suitable lubricant distribution components such as nozzles, valves, jets, and the like. The plurality of conduit 124, in the illustrated example, may be routed from the pump 122 to the transmission 106 and from the transmission 106 to the reservoir 120. Additionally, the differential 108 may include an enclosed splash lubrication arrangement. In such an example, as the differential 108 rotates, lubricant may be picked up and distributed to various components of the differential 108 from a sump 126 in the differential 108. As such, the lubricant in the differential 108 may be self-contained and may not be in fluidic communication with the lubricant conduits in the transmission 106, in one example. However, in other examples, lubricant may be routed between the transmission 106 and the differential 108 and from the differential 108 to the reservoir 120. In still other examples, the reservoir 120 may not be an external reservoir but instead may be incorporated in the transmission 106. Further, in some examples, the differential 108 may be housed within the transmission 106. Thus, lubricant may be passively supplied (e.g., splashed) from the reservoir 120 to the transmission 106 and/or the differential 108. In some examples, lubricant may also be routed between the transmission 106 and the motive power source 104 and from the motive power source 104 to the reservoir 120. Other lubricant routing schemes have been contemplated, such as conduit arrangements that flow lubricant in parallel through the transmission 106 and the differential 108.

The vehicle 100 may include a control system 128 with a controller 130. The controller may include a processor 132 and a memory 134 holding instructions stored therein that when executed by the processor 132 may cause the controller 130 to perform various methods, control techniques, etc. described herein. The processor 132 may include a microprocessor unit and/or other types of circuits. The memory 134 may include known data and storage mediums such as random access memory, read-only memory, keep alive memory, combinations thereof, etc. The memory 134 may further include non-transitory memory.

The control system 128 may receive various signals from sensors 136 positioned in different locations in the vehicle 100 and the powertrain 102. Conversely, the controller 130 may send control signals to a plurality of actuators 138 coupled at different locations in the vehicle 100 and the powertrain 102.

For example, the controller 130 may send signals to the motive power source 104. Responsive to receiving the command signal, an actuator in the motive power source 104 may adjust output speed or torque. Other controllable components in the vehicle and transmission system may function in a similar manner with regard to receiving command signals and actuator adjustment. For instance, the pump 122 may receive control signals which trigger adjustment of a pump actuator to vary the output flowrate of the pump 122. Further, during a drive mode, the controller 130 may adjust the motive power source 104 to achieve a desired vehicle speed, for instance. Conversely, during a coast mode, the motive power source 104 may be inactive and power may travel from at least one of the first drive wheel 110 and the second drive wheel 112 to the differential 108 and so forth.

FIG. 2 shows a drive unit assembly 200 according to the present disclosure. FIG. 2, as well as each of FIGS. 3-6, includes a Cartesian coordinate system 299 to orient the views. The y-axis may be a vertical axis (e.g., parallel to a gravitational axis), the x-axis may be a longitudinal axis (e.g., horizontal axis), and/or the z-axis may be a lateral axis, in one example. However, the axes may have other orientations, in other examples.

The drive unit assembly 200 is a non-limiting example of a gearbox in the transmission 106 of FIG. 1. The drive unit assembly 200 may provide a conversion of speed/torque between the motive power source and the drive wheels of a vehicle. The drive unit assembly 200 may utilize gear reduction, or any other suitable speed/torque conversion method, through the use of a gear assembly 204.

The drive unit assembly 200 may include a housing 202 with an inner surface defining a hollow interior portion of the drive unit assembly 200. The housing 202 may be of a size and shape to enclose at least a portion of the gear assembly 204. The housing 202 may have a bottom inner surface 203 that is flat (e.g., no depression or curvature) along a z-x plane. In the view shown in FIG. 2, a side cover of the housing 202 has been removed to facilitate visualization of the interior components of the drive unit assembly (e.g., the gear assembly 204).

The gear assembly 204 may be comprised of at least a first rotating gear and a second rotating gear, where the teeth of the first rotating gear and the second rotating gear may be meshed together. In some examples, the gear assembly 204 may include a plurality of rotating gears, such as a first rotating gear 206, a second rotating gear 208, and a third rotating gear 210. In other examples, the gear assembly 204 may include a different suitable number of rotating gears, for example four or more rotating gears. The gear assembly 204 may be used to transfer rotational power from the motive power source to at least one axle shaft.

The drive unit assembly 200 may have an integrated oil shroud and pump oil pickup 212 which is accommodated within the housing 202. The integrated oil shroud and pump oil pickup 212 includes an oil shroud element 214 and an oil intake element 216 coupled to and integrally formed with the oil shroud element 214. The integrated oil shroud and pump oil pickup 212 may be one continuous component created through injection molding or another suitable construction method. In an example, the one continuous component may be unitary and without any seams, without connectors, and without any other joining features. By integrally forming the oil shroud element 214 and the oil intake element 216, the vertical packaging space required for the drive unit assembly 200 and the complexity of manufacturing may be reduced.

The oil shroud element 214 may have similar shape to, and extend along the bottom and partially up the sides of, gears located below an operating oil level (e.g., the first rotating gear 206 and the second rotating gear 208) of the gear assembly 204, to thereby enclose the lower portion of the first rotating gear 206 and second rotating gear 208. In some examples, the oil shroud element 214 may extend around the portion of the total circumference below the operating oil level of all rotating gears (e.g., the oil shroud element 214 may be shaped and positioned to extend around the portion of each gear below the operating oil level). The bottom inner surface of the oil shroud element 214 (shown in FIG. 5) may be positioned a suitable distance, such as in a range of 1-5 mm, below the lowest gears of the gear assembly 204 of the drive unit assembly 200. In this way, the oil shroud element 214 may be configured to collect oil for lubrication of the lowest rotating gears by collecting distributed oil within the walls of the oil shroud element 214. The oil shroud element 214 separates the corresponding gear assembly 204 from excess oil collecting in the bottom of the housing 202, and may therefore reduce the amount of excess oil that the gears may have to rotate through.

The housing 202 of the drive unit assembly 200 may act as an oil sump with excess oil collecting in the bottom of the housing 202. The excess oil that is collected in the bottom of the housing 202 may then be directed to other components in an oil recirculating circuit by a pump (such as pump 122 of FIG. 1), which is not shown in FIG. 2 but may be directly coupled to an exterior of the housing 202 (e.g., on an exterior surface of the side cover). The oil intake element 216 may play a passive role in pumping excess oil out of the bottom of the housing 202 through the use of an oil pickup 218. The oil pickup 218 may be located on the bottom of the oil intake element 216 and may include one or more orifices through which oil may be suctioned and directed to an oil outlet 222 of the oil intake element 216, which is in turn fluidly coupled to an inlet of the pump (e.g., the oil outlet 222 may be directly coupled to the pump such that the oil outlet 222 extends through the side cover and terminates at the pump). The bottom surface of the oil intake element 216 may face the bottom inner surface 203 of the housing 202 and may extend in a plane (e.g., a z-x plane) that is parallel to a plane of the bottom inner surface 203. The bottom surface of the oil intake element 216 may be positioned a suitable distance C1, such as within 0.1-1 centimeters, above the bottom inner surface 203 of the housing 202, which may allow the oil pickup 218 to be submerged and/or to come into contact with the excess oil in the bottom of the housing 202. The excess oil may travel through the oil pickup 218, across a magnet 220 positioned along the bottom of the oil intake element 216, and through the oil outlet 222 before being directed to other components in the oil recirculating circuit via the pump.

The distance C1 that the oil intake element 216 may be positioned above the bottom inner surface 203 of the housing 202 may keep the integrated oil shroud and pump oil pickup 212 from blocking the excess oil at the bottom of the housing 202 to allow efficient suction of the oil in the housing 202. Further, the excess oil at the bottom of the housing 202 may move around the bottom of the housing 202 (e.g., towards at least one wall of the housing 202) when the vehicle in which the housing 202 is positioned accelerates in any direction. The oil pickup 218 may therefore be positioned at a midpoint of the bottom of the housing 202 (e.g., approximately half-way between side edges of the bottom inner surface 203 along the x-axis) to help the oil pickup 218 to be continuously submerged in excess oil even when the oil shifts towards one side of the housing 202.

While the integrated oil shroud and pump oil pickup 212 is described herein as being positioned in a transmission gearbox, it is to be appreciated that the integrated oil shroud and pump oil pickup 212 of FIG. 2 may be used in other drive unit assemblies including but not limited to at least a part of a single speed transmission, a multi speed transmission, a differential, a power transfer unit, a transfer case, or an inter-axle differential. In some examples, the integrated oil shroud and pump oil pickup 212 may be used in vehicles in which the motive power source is an internal combustion engine, an electric energy storage device, or a combination of internal combustion engine and electric energy storage device.

Figure 3:
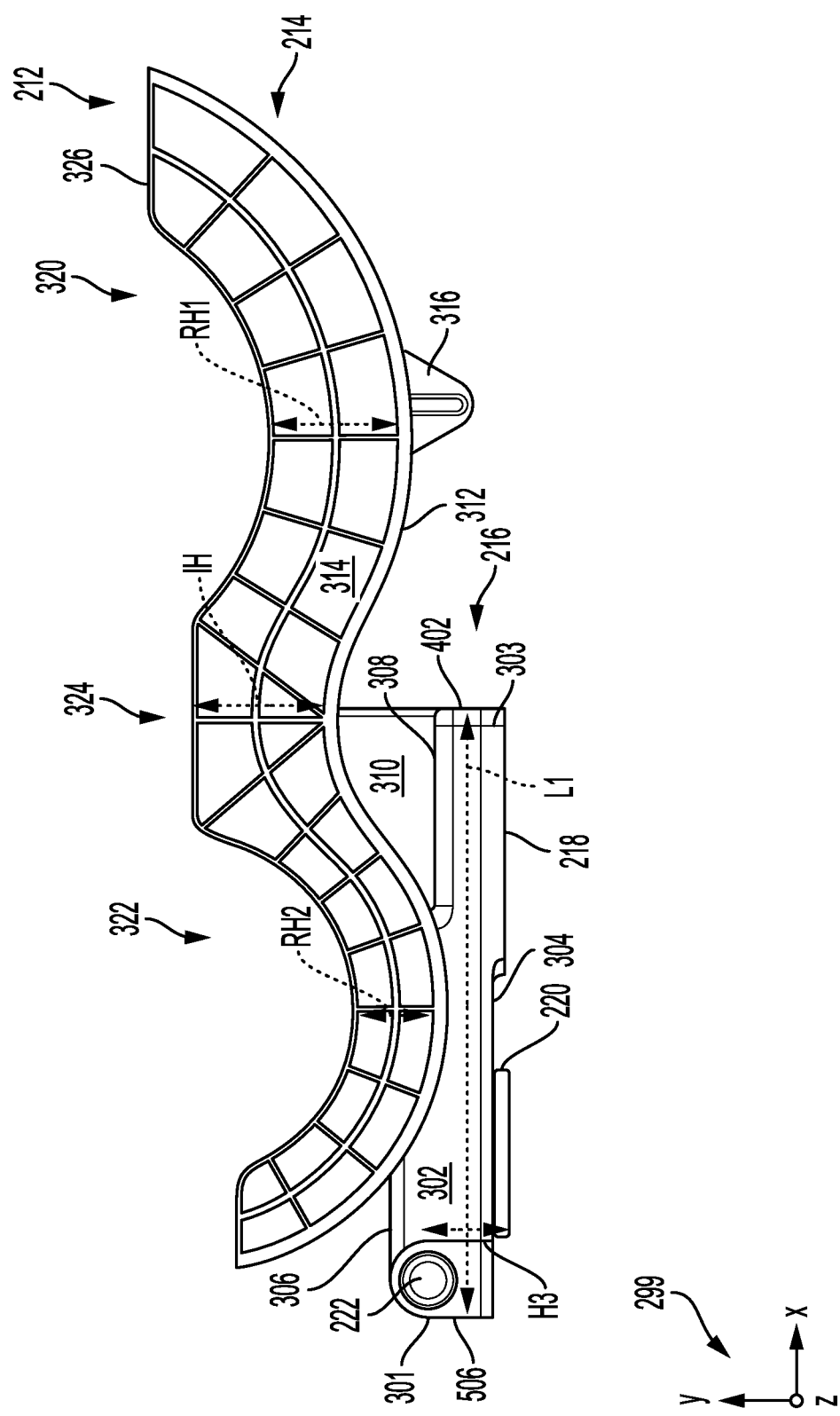
FIG. 3 is a front view of the integrated oil shroud and pump oil pickup of FIG. 2.
Figure 4:
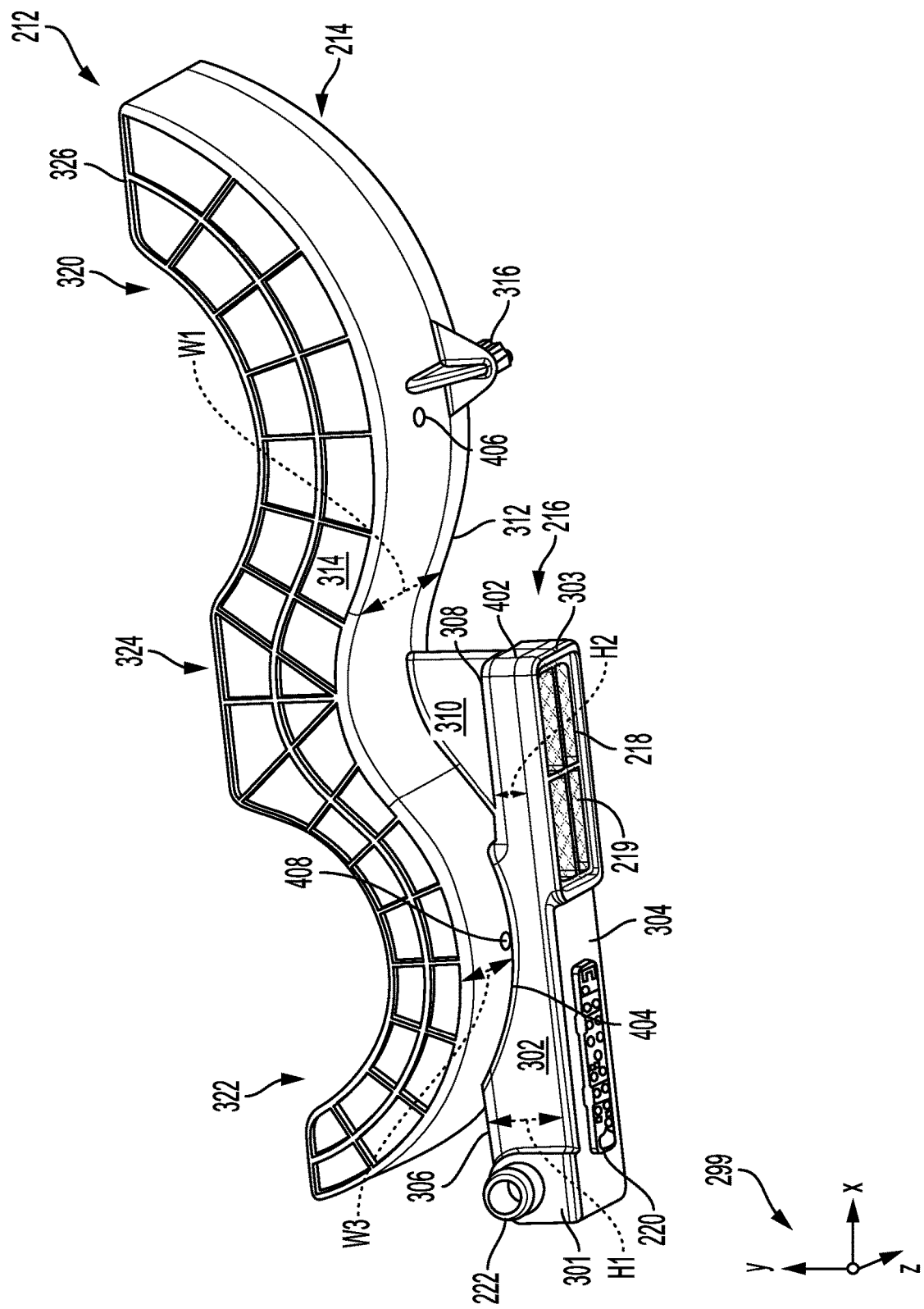
FIG. 4 is a bottom perspective view of the integrated oil shroud and pump oil pickup of FIG. 2.
Figure 5:
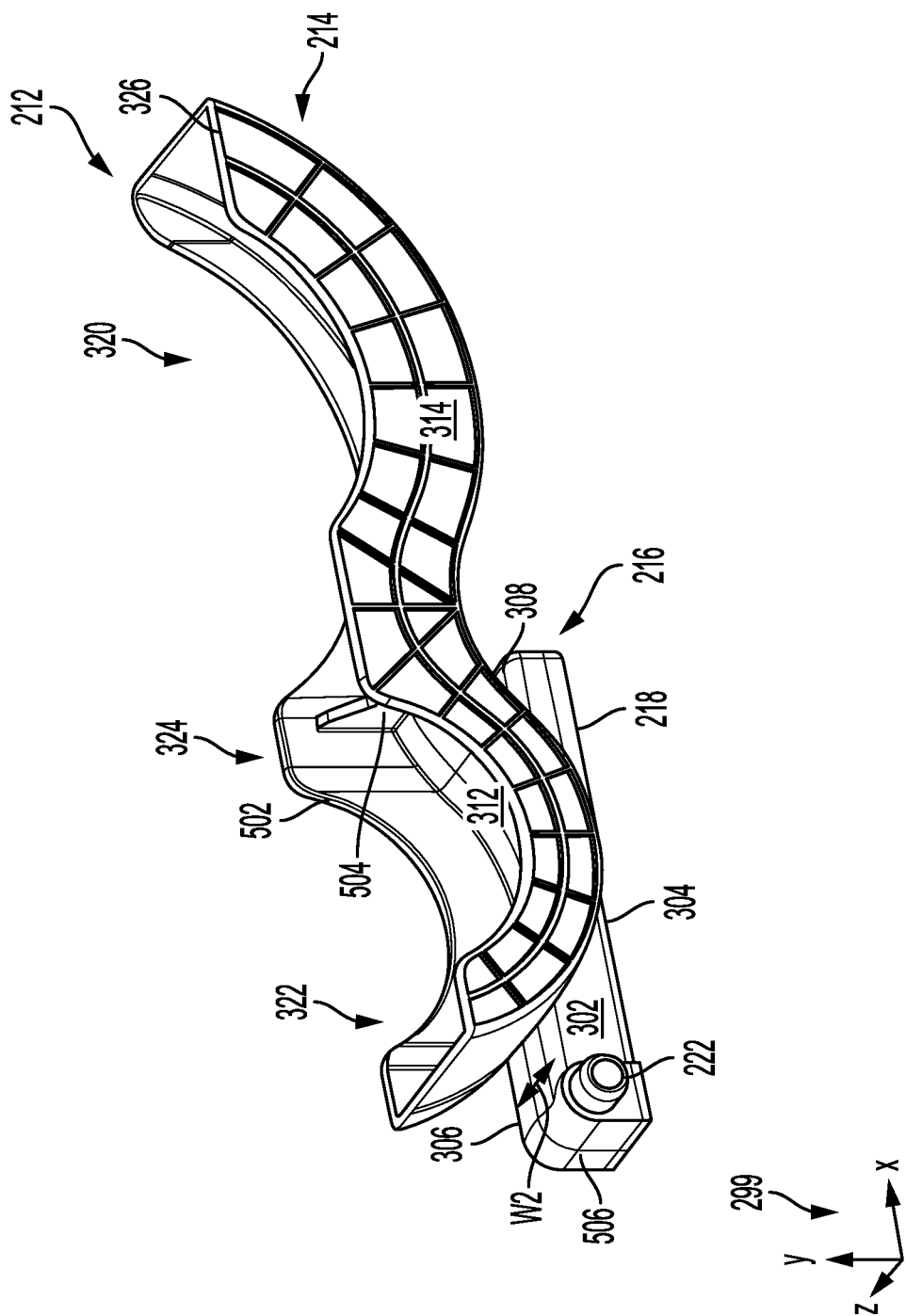
FIG. 5 is a top perspective view of a front side of the integrated oil shroud and pump oil pickup of FIG. 2.
Figure 6:
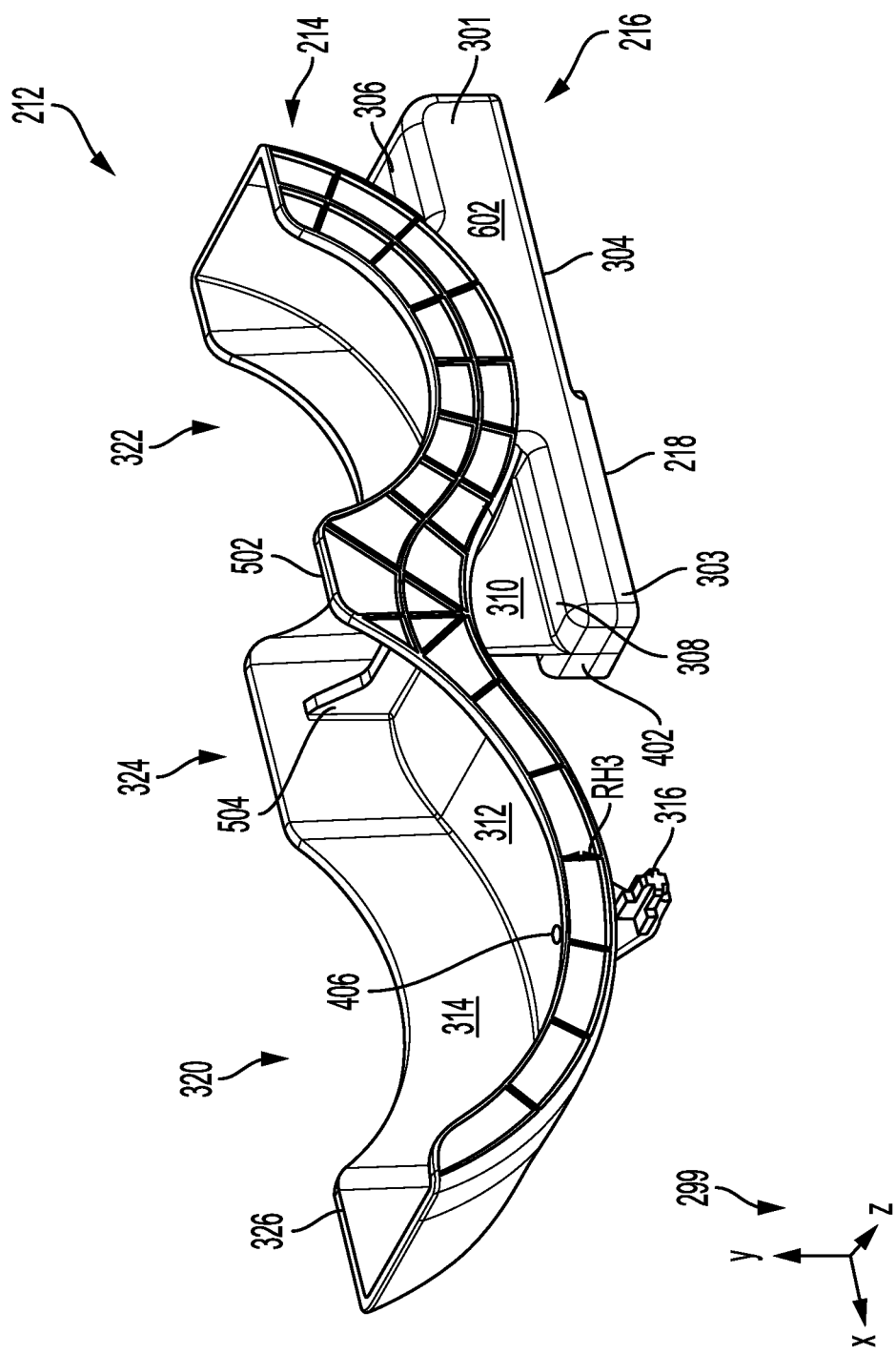
FIG. 6 is a second top perspective view of a rear side of the integrated oil shroud and pump oil pickup of FIG. 2.

FIGS. 3-6 show multiple perspectives of the integrated oil shroud and pump oil pickup 212 and will be described collectively. FIG. 3 shows a front view of the integrated oil shroud and pump oil pickup 212. FIG. 4 shows a bottom perspective view of the integrated oil shroud and pump oil pickup 212. FIG. 5 shows a top perspective view of a front side of the integrated oil shroud and pump oil pickup 212. FIG. 6 shows a top perspective view of a rear side of the integrated oil shroud and pump oil pickup 212.

The oil intake element 216 may be formed of a body 301 and a bottom plate 303 coupled to the body 301. The body 301 of the oil intake element 216 may include a top comprised of a first top surface 306 and a second top surface 308, which are opposite to the bottom plate 303 forming a bottom 304 of the oil intake element 216. The body 301 of the oil intake element 216 may also include a first side 506 which is opposite to a second side 402 of the body 301 of the oil intake element 216. The body 301 of the oil intake element 216 may further include a front 302 which is opposite to a back 602 of the body 301 of the oil intake element 216. The oil shroud element 214 may include a bottom 312, a front side 314, and a back side 502 opposite the front side 314.

The oil shroud element 214 may have a suitable curvature to match the size and shape of at least a portion of a gear assembly, such as the gear assembly 204 of FIG. 2. In this way, the oil shroud element 214 may include two curved portions where the front side 314, the back side 502, and the bottom 312 may all curve downward (e.g., in the direction of the force of gravity) then back upward to accommodate and shroud the lower portion of at least one rotating gear of a gear assembly in an area of concavity. As illustrated in FIGS. 3-6, the two curved portions may accommodate and shroud the bottom of a first gear and a second gear of a gear assembly.

The two curved portions may include a first curved portion 320 configured to be positioned below the first rotating gear 206 and a second curved portion 322 configured to be positioned below the second rotating gear 208. The first curved portion 320 may transition to the second curved portion 322 at an intersecting region 324 positioned intermediate the first curved portion 320 and the second curved portion 322. Because the second rotating gear 208 is smaller than the first rotating gear 206, the second curved portion 322 may have a smaller radius of curvature than the first curved portion 320. Further, because the second rotating gear 208 is positioned vertically lower within the housing 202 than the first rotating gear 206, the lowest point of the second curved portion 322 may be vertically lower than the lowest point of the first curved portion 320. Thus, a top surface 326 of the front side 314 of the oil shroud element 214 (as well as a top surface of the back side of the oil shroud element) may include a first flat section that transitions to a first curved section (forming the top surface of the first curved portion 320), a second flat section in the intersecting region 324, and a second curved section that transitions to a third flat section (forming the top surface in the second curved portion 322).

Further, the front side 314 at the first curved portion 320 may have a first radial height RH1 that is approximately equal to an intersecting height IH of the intersecting region 324 and that is greater than a second radial height RH2 of the second curved portion 322 (e.g., due to the second rotating gear 208 being smaller than the first rotating gear 206). The back side 502 at the first curved portion 320 may have a third radial height RH3 that is smaller than the first radial height RH1 and the second radial height RH2 to provide clearance between the integrated oil shroud and pump oil pickup 212 and other components within a drive unit assembly housing. In some examples, the first radial height RH1 may be approximately 30% of the radius of the first rotating gear 206. Similarly, the second radial height RH2 may be approximately 30% of the radius of the second rotating gear 208. The third radial height RH3 may be approximately 10% of the radius of the first rotating gear 206. The intersecting height IH may be such that the top of the intersecting region 324, relative to the y-axis, is configured to be positioned above the operating oil level in the bottom of the housing 202. The first curved portion 320 and the second curved portion 322 may be aligned along the x-axis, such that the two curved portions may be aligned along a common axis and are not offset from each other along the z-axis.

The oil intake element 216 may be positioned below (e.g., in the direction of the force of gravity) and be of one piece with the oil shroud element 214. As mentioned previously, the top of the oil intake element 216 may be comprised of the first top surface 306 and the second top surface 308, as well as a shared intermediate portion 404 that extends between the first top surface 306 and the second top surface 308. The oil intake element 216 may be seamlessly connected (e.g., without any seams or joints) to the bottom 312 of the oil shroud element 214 at the shared intermediate portion 404. The shared intermediate portion 404 may be a solid surface and the inside surface of the bottom 312 of the oil shroud element 214 may not be open to the inner volume of the oil intake element 216. The shared intermediate portion 404 may form both a portion of the top of the oil intake element 216 and a portion of the bottom of the second curved portion 322 of the oil shroud element 214.

The oil pickup 218 may be included in the bottom plate 303 and may extend horizontally from approximately a midpoint of the bottom of the second curved portion 322 (e.g., a lowest point of the second curved portion 322) to approximately a midpoint of a bottom of the intersecting region 324 and may be cantilevered out from the oil shroud element 214 in order to be positioned at the midpoint/center of the housing 202, as explained above. The oil intake element 216 and the oil shroud element 214 may also be permanently joined together by a reinforcement plate 310, which may extend vertically from the bottom 312 of the oil shroud element 214 to the second top surface 308 of the oil intake element 216. The reinforcement plate 310 may be positioned closer to the back of the oil intake element 216 than to the front 302 of the oil intake element 216 (as shown in FIG. 4). The reinforcement plate 310 may be flat and have a relatively thin thickness (e.g., 1-3 mm) along the z-axis and may be coupled to the bottom 312 of the oil shroud element 214 continuously from the terminating edge of the shared intermediate portion 404 to the midpoint of the bottom of the intersecting region 324, such that the top edge of the reinforcement plate 310 has a curvature that matches the curvature of the second curved portion 322. The reinforcement plate 310 may be positioned between the oil pickup 218 and the bottom 312 of the oil shroud element 214 in order to provide structural support (e.g., reduce potential beam vibration) to the portion of the oil intake element 216 that extends horizontally towards the center of the integrated oil shroud and pump oil pickup 212.

The first top surface 306 and the second top surface 308 of the oil intake element 216 may have a second width W2 (shown in FIG. 5) along the z-axis, such as in a range of 3-6 centimeters, while the first curved portion 320, the second curved portion 322, and the intersecting region 324 of the oil shroud element 214 may have a common first width W1 along the z-axis, that is larger than the second width W2, such as in a range of 6-10 centimeters. The first width W1 may be approximately 12 millimeters wider than the face-width of the first rotating gear 206 and the second rotating gear 208. As illustrated, the first width W1 may be larger than the second width W2 and the oil shroud element 214 may overhang the front 302 of the oil intake element 216 by a third width W3 along the z-axis. In some examples, the oil shroud element 214 may not overhang the back 602 of the oil intake element 216. In some examples, the outside surface of the back 602 of the oil intake element 216 may be flush with the back side 502 of the oil shroud element 214 at the shared intermediate portion 404, as shown in FIG. 6. In other examples, the outside surface of the back 602 of the oil intake element 216 may extend further along the z-axis than the back side 502 of the oil shroud element 214 at the shared intermediate portion 404. In still further examples, the oil shroud element 214 may overhang the back 602 of the oil intake element 216, similar to the front side. Because the oil shroud element 214 can be positioned independently of the center of the gear width, the oil shroud element 214 may be positioned at a location based on the packaging constraints of the housing in which the integrated oil shroud and oil pickup is positioned (e.g., the housing 202 of the drive unit assembly).

The bottom 304 of the oil intake element 216 may be opposite to the first top surface 306 and second top surface 308 of the oil intake element 216. As shown in FIG. 3 and FIG. 4, the bottom 304 of the oil intake element 216 may include the oil pickup 218 and the magnet 220. The oil pickup 218 may protrude downwards from the bottom 304 of the oil intake element 216, which may allow the oil pickup 218 to come into contact with smaller amounts of excess oil in the bottom of the housing 202 while still maintaining a demanded clearance between the bottom 304 of the oil intake element 216 and the bottom inner surface 203 of the housing 202 in the region of the oil outlet 222. The oil pickup 218 may include at least one orifice through which excess oil in a drive unit assembly housing, such as the housing 202 of FIG. 2, can flow. As shown in FIG. 4, the oil pickup 218 may include four rectangular-shaped orifices, which may support an oil screen or filter while allowing as much open area as possible for demanded oil flow. In some examples, the oil pickup 218 may include a different number of rectangular shaped orifices. In other examples, the oil pickup 218 may include orifices of a different shape, such as triangles or ovals. In some examples, the oil pickup 218 may include an oil screen or filter 219 positioned to cover at least one or all orifices of the oil pickup 218. An oil filter or screen may filter debris from oil that is flowing through the oil pickup 218. In other examples, the oil pickup 218 may not have an oil filter or screen. The magnet 220 on the oil intake element 216 may remove metallic and/or magnetic debris from the oil as it is pumped through the oil intake element 216. The magnet 220 may fit in a slot present on the bottom 304 of the oil intake element 216. The magnet 220 may be facing the inner volume of the oil intake element 216. In some examples, the magnet 220 may be in a different position on the bottom 304 of the oil intake element 216, or the magnet 220 may be absent entirely from the oil intake element 216.

The front 302 of the oil intake element 216 may have a length L1 (shown in FIG. 3) that extends continuously along the x-axis from the first side 506 to the second side 402. As shown in FIG. 3, the first side 506 of the oil intake element 216 may be positioned past a terminating edge of the second curved portion 322 in the negative x-direction, which may allow the oil outlet 222 to be positioned so that the oil outlet 222 is aligned with and can couple to the pump. The second side 402 of the oil intake element 216 may be positioned below a longitudinal center of the oil shroud element 214 (e.g., below the intersecting region 324). In this way, the oil intake element 216 may extend longitudinally (e.g., in a horizontal direction along the x-axis) from the center of the oil shroud element 214 to beyond a first terminating edge of the oil shroud element 214. The shared intermediate portion 404 may comprise a portion of the length L1, such as 50% or less of the length L1.

In some examples, the front 302 may have a first height H1 (shown in FIG. 4) along the y-axis, such as in a range of 2-4 centimeters, which extends from the bottom 304 to the first top surface 306. The first height H1 may be constant along a first portion of the oil intake element 216, from the first side 506 of the oil intake element 216 until the shared intermediate portion 404. The height H1 may be selected to both position the oil outlet 222 in alignment with the pump and provide a planar coupling surface of the body 301 of the oil intake element 216, which may facilitate simplified manufacturing and coupling of the bottom plate 303 to the body 301.

The front 302 may also have a second height H2 along the y-axis, such as in a range of 1-3 centimeters, which extends from the bottom 304 to the second top surface 308. The second height H2 may be constant along a second portion of the oil intake element 216, from the shared intermediate portion 404 until the second side 402 of the oil intake element 216. As illustrated, the first height H1 may be larger than the second height H2. The height H2 may be selected so as to position the oil intake element 216 at a desired height above the bottom of the housing 202 in order to facilitate oil pickup at a target height from the bottom of the housing 202, relative to the y-axis, and flow of the oil to the oil outlet 222. The oil intake element 216 may have variable height under the shared intermediate portion 404, for example between the second height H2 and the first height H1. The back 602 of the oil intake element 216 which is opposite the front 302 may have similar dimensions but mirrored over the xy-plane of the Cartesian coordinate system 299.

As illustrated in FIGS. 3-5, the front 302 of the oil intake element 216 may include the oil outlet 222. The oil outlet 222 may extend through the housing 202 and be connected to a pump, directly or through an intermediary tubing or another suitable connection. In this way, the oil outlet 222 helps to provide a suction force from the pump to pull oil into the oil pickup 218 and across the magnet 220. As shown in FIG. 5, the oil outlet 222 may include a port that extends outward (e.g., along the z-axis) from the front 302 of the oil intake element 216. The center of the oil outlet 222 may be positioned at the same height (e.g., position along the y-axis) as the lowest point of the bottom of the oil shroud element 214 (e.g., the bottom of RH2 in FIG. 3), and may also be positioned at a third height H3 (shown in FIG. 3) above the bottom surface of the oil pickup 218.

The first side 506 of the oil intake element 216 and the second side 402 of the oil intake element 216 may both have the same width as the top of the oil intake (e.g., the first width W1). The first side 506 of the intake element may have the first height H1 and the second side 402 of the intake element may have the second height H2.

As shown in FIG. 3 and FIG. 4, a housing mounting pin 316 may be coupled to the bottom 312 of the oil shroud element 214. The housing mounting pin 316 may be used to couple the integrated oil shroud and pump oil pickup 212 to the drive unit assembly housing to prevent the integrated oil shroud and pump oil pickup 212 from moving (e.g., shifting, rotating, etc.) relative to the drive unit assembly housing. In this way, the integrated oil shroud and pump oil pickup 212 may not interfere with the drive unit assembly and may continue to shroud the assembly even if the assembly moves suddenly or drastically. The housing mounting pin 316 may couple into a bore in the drive unit assembly housing. In some examples, one or more additional pins/sleds may be included that may touch off on flats on the drive unit assembly housing to support the integrated oil shroud and pump oil pickup 212 in the axial direction (e.g., relative to the y-axis), which may reduce the number of drilled holes needed and thus simplify manufacturing. While one housing mounting pin is shown in FIGS. 3-5, it is to be appreciated that additional housing mounting pins (e.g., 1-2 additional housing mounting pins) as well as sleds could be included on the shroud element and/or oil intake element. The housing mounting pin 316, alone or with additional housing mounting pins, may allow the integrated oil shroud and pump oil pickup 212 to be positioned between two halves of a clamshell-style housing cover without the use of any additional fasteners.

As illustrated in FIG. 4, the bottom 312 of the oil shroud element 214 may have at least one drain hole, such as a first drain hole 406 and a second drain hole 408. Each drain hole may allow excess oil to drain out of the oil shroud element 214 and into the bottom of a drive unit assembly housing. In some examples, the first drain hole 406 may be positioned at the lowest point of the first curved portion 320 and the second drain hole 408 may be positioned at the lowest point of the second curved portion 322. The second drain hole 408 may be positioned forward of the oil intake element 216 on the bottom 312 of the second curved portion 322 (e.g., between a front side 314 of the oil shroud element 214 and the front 302 of the oil intake element 216). In other examples, more or fewer drain holes may be included on the bottom 312 of the oil shroud element 214.

As shown in FIGS. 3-6, the oil shroud element 214 may have the front side 314 with an inner surface and an outer surface. Similarly, as shown in FIG. 5, the oil shroud element 214 may have a back side 502 with an inner surface and an outer surface. The inner surfaces of both the front side 314 the back side 502 may be smooth in texture, which may allow excess oil to slide down the inner surfaces towards the first drain hole 406 and/or the second drain hole 408. The outside surfaces of both the front side 314 the back side 502 may include a ribbed pattern, which may provide structural support.

As illustrated in FIGS. 5 and 6, the oil shroud element 214 may include an inner rib 504 that is connected to the back side 502, the front side 314, and the bottom 312 of the oil shroud element 214 at the intersecting region 324 of the shroud element. The inner rib 504 may be a suitable shape, and may have variable height with a tallest point that is less than the height of the back side 502 at the location of the inner rib 504 (e.g., a height that is 60% of the height of the back side 502. The height of the inner rib 504 may be tallest at the points immediately adjacent to the back side 502 and the front side 314 and may be shortest at a center section (e.g., in the middle of the back side 502 and the front side 314 relative to the z-axis) of the inner rib 504. The inner rib 504 may help to keep excess oil that has collected in the oil shroud element 214 from splashing back onto a gear assembly. The inner rib 504 may also provide structural support for the integrated oil shroud and pump oil pickup 212.

Referring back to FIG. 2, it may be appreciated that the oil intake element 216 is integrated with the oil shroud element 214 at the second curved portion 322 in order to fit in existing space within the drive unit assembly 200, and that the oil intake element 216 is sized and shaped to fit in the existing space within the drive unit assembly 200. For example, the housing 202 may track the shape of the first rotating gear 206 more closely than the second rotating gear 208, resulting in a smaller amount of free space in the drive unit assembly 200 under the first rotating gear 206 than under the second rotating gear 208. Further, the housing 202 may extend past the second rotating gear 208 to accommodate additional components of the drive unit assembly (e.g., third rotating gear 210), creating additional free space to the side of the second rotating gear 208. The oil intake element 216 may be sized so that the bottom of the oil intake element 216 (and specifically the oil pickup 218) is within at least a first distance (e.g., the clearance C1) of the bottom inner surface 203 of the housing 202 to facilitate oil pickup and also sized so that the oil outlet 222 is conveniently positioned to fluidly couple to the pump outside the housing. The oil pickup 218, magnet 220, and oil outlet 222 may all be aligned along/relative to a common longitudinal axis directly below the oil shroud element 214 and may not be laterally offset from each other by more than a threshold amount (e.g., not laterally offset by more than 1 cm), which enables the oil intake element 216 to take up less than, or at least no more than, the lateral width of the oil shroud element 214. In some examples, the oil intake element 216 may be wider (e.g., larger relative to the z-axis) than the oil shroud element 214.

Thus, the integrated oil shroud and pump oil pickup 212 described herein includes an intake element and a shroud element combined to form one continuous component. In some examples, the intake element may include an oil pickup, a magnet, and an oil outlet which create at least one passage through which excess oil may be pumped out of the housing of a drive unit assembly. In some examples, the shroud element may include an inner rib, sides, and drain holes to reduce the oil churning losses of at least a first rotating gear of a gear assembly. The integrated oil shroud and pump oil pickup may be created through plastic injection molding, additive manufacturing, or another suitable construction method that would result in the seamless connection of the intake element and the shroud element.

In this way, the integrated oil shroud and pump oil pickup describe herein may provide the utility of both an oil shroud and pump oil pickup, while reducing the expense and/or complexity of manufacturing by reducing two components into one. The integrated oil shroud and pump oil pickup may also decrease the vertical packaging space that would be required if there was a separate component for gear assembly shrouding alongside either a remote pickup tube or a separate oil filter.

In some examples, rather than be fully integrated as described herein, the oil shroud element and oil intake element may be manufactured as separate parts and coupled together to form a combined oil shroud and oil pickup. For example, the oil intake element may be glued, welded, or otherwise fixed to the oil shroud element along the shared intermediate portion. In still further examples, the oil shroud element and oil intake element may be manufactured as separate parts and each coupled independently to the housing and/or other component(s) of the drive unit assembly.

FIGS. 2-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for an assembly comprising: an oil shroud element configured to enclose a lower portion of at least one rotating gear of a gearbox, and an oil intake element with an oil filter and an oil outlet configured to couple to a pump of an oil recirculating circuit, where the oil intake element is in face-sharing contact with the oil shroud element. In a first example of the system, the oil intake element comprises a front, a back, a first side, a second side, a bottom, and a top to enclose an inner volume, wherein the oil outlet is located on the front of the oil intake element adjacent to the first side. In a second example of the system, optionally including the first example, the top of the oil intake element includes a first top surface, a second top surface, and a shared intermediate portion positioned between the first top surface and the second top surface, wherein the shared intermediate portion forms a portion of an inner surface of a bottom of the oil shroud element. In a third example of the system, optionally including one or both of the first and second examples, the bottom of the oil intake element includes an oil pickup comprised of at least one orifice and positioned adjacent to the second side, and wherein the oil filter is positioned at the oil pickup. In a fourth example of the system, optionally including one or more or each of the first through third examples, the first side of the oil intake element is positioned beyond a first terminating edge of the oil shroud element and the second side of the oil intake element is positioned directly below a midpoint of the oil shroud element, and wherein the oil intake element has a first width that is less than a second width of the oil shroud element. In a fifth example of the system, optionally including one or more or each of the first through fourth examples, the bottom of the oil intake element includes a magnet facing the inner volume. In a sixth example of the system, optionally including one or more or each of the first through fifth examples, the oil shroud element includes at least one drain hole. In a seventh example of the system, optionally including one or more or each of the first through sixth examples, the oil intake element is coupled to the oil shroud element without any seams or joints.

The disclosure also provides support for a system, comprising: a gearbox comprising a housing enclosing at least one rotating gear, a combined oil shroud and oil pickup accommodated within the housing, the combined oil shroud and oil pickup including an oil shroud element shaped and sized to enclose a lower portion of the at least one rotating gear and an oil intake element including an oil outlet configured to couple to an inlet of a pump and an oil pickup comprising at least one orifice, the combined oil shroud and oil pickup having a shared intermediate portion that forms both a portion of a top of the oil intake element and a portion of a bottom of the oil shroud element. In a first example of the system, the oil pickup element includes a bottom surface that faces a bottom inner surface of the housing and extends in a plane parallel to a plane of the bottom inner surface, and wherein the bottom surface of the oil pickup element is positioned above the bottom inner surface of the housing by at least a first distance. In a second example of the system, optionally including the first example, the at least one rotating gear includes a first rotating gear and a second rotating gear, and wherein the oil shroud element includes a first curved portion sized and shaped to enclose a lower portion of the first rotating gear, a second curved portion sized and shaped to enclose a lower portion of the second rotating gear, and an intersecting region positioned between the first curved portion and the second curved portion. In a third example of the system, optionally including one or both of the first and second examples, a top of the oil intake element includes a first top surface, a second top surface, and the shared intermediate portion positioned between the first top surface and the second top surface, wherein the shared intermediate portion forms a portion of a bottom of the second curved portion of the oil shroud element. In a fourth example of the system, optionally including one or more or each of the first through third examples and wherein the oil pickup is cantilevered out from the bottom of the second curved portion and terminates at a position vertically below the intersecting region. In a fifth example of the system, optionally including one or more or each of the first through fourth examples, the combined oil shroud and oil pickup further comprises a reinforcement plate coupled between the second top surface and the oil shroud element at the second curved portion and the intersecting region. In a sixth example of the system, optionally including one or more or each of the first through fifth examples, the oil intake element extends on a first side longitudinally beyond a terminating edge of the second curved portion and the oil outlet is positioned on a front of the oil intake element at the first side. In a seventh example of the system, optionally including one or more or each of the first through sixth examples, the oil shroud element comprises a bottom, a front, and a back, each of the front of the oil shroud element and the back of the oil shroud element coupled to the bottom of the oil shroud element, the bottom of the oil shroud element having a first width from the front of the oil shroud element to the back of the oil shroud element, and wherein the oil intake element has a second width, from a front of the oil intake element to a back of the oil intake element, that is less than the first width of the bottom of the oil shroud element. In an eighth example of the system, optionally including one or more or each of the first through seventh examples, the oil shroud element includes a first drain hole on the first curved portion and a second drain hole on the second curved portion.

The disclosure also provides support for a system, comprising: a gearbox comprising a housing enclosing at least a first rotating gear and a second rotating gear, the first rotating gear having teeth meshed with teeth of the second rotating gear, and an oil shroud and pickup accommodated within the housing, the oil shroud and pickup comprising: an oil shroud element comprising a first curved portion sized and shaped to enclose a lower portion of the first rotating gear, a second curved portion sized and shaped to enclose a lower portion of the second rotating gear, and an intersecting region positioned between the first curved portion and the second curved portion, wherein each of the first curved portion, the second curved portion, and the intersecting region are aligned along a common longitudinal axis and have a common first width, and an oil intake element coupled to the oil shroud element directly below the second curved portion and including an oil outlet configured to couple to an inlet of a pump and an oil pickup comprising at least one orifice, and wherein the oil outlet and the oil pickup are aligned relative to the common longitudinal axis such that the oil intake element has a second width that is less than the first width. In a first example of the system, the oil shroud element comprises a first drain hole on the first curved portion and a second drain hole on the second curved portion, the second drain hole positioned forward of the oil intake element. In a second example of the system, optionally including the first example, the oil pickup is cantilevered out from a bottom of the second curved portion and terminates at a position vertically below the intersecting region, and wherein the oil shroud and pickup further comprises a reinforcement plate coupled between a top surface of the oil intake element and a bottom surface of the oil shroud element at the second curved portion and the intersecting region.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An assembly comprising:
an oil shroud element configured to enclose a lower portion of at least one rotating gear of a gearbox; and
an oil intake element with an oil filter and an oil outlet configured to couple to a pump of an oil recirculating circuit, wherein the oil intake element is in face-sharing contact with the oil shroud element.

2. The assembly of claim 1, wherein the oil intake element comprises a front, a back, a first side, a second side, a bottom, and a top to enclose an inner volume, wherein the oil outlet is located on the front of the oil intake element adjacent to the first side, wherein the front of the oil intake element extends from the first side to the second side along a longitudinal axis of the oil intake element, the second side is positioned below a longitudinal center of the oil shroud element, and the first side of the oil intake element is positioned past a terminating edge of the oil shroud element in a direction parallel to the longitudinal axis.

3. The assembly of claim 2, wherein the top of the oil intake element includes a first top surface, a second top surface, and a shared intermediate portion positioned between the first top surface and the second top surface, wherein the shared intermediate portion forms a portion of an inner surface of a bottom of the oil shroud element.

4. The assembly of claim 2, wherein the bottom of the oil intake element includes an oil pickup comprised of at least one orifice and positioned adjacent to the second side, and wherein the oil filter is positioned at the oil pickup.

5. The assembly of claim 4, wherein the first side of the oil intake element is positioned beyond a first terminating edge of the oil shroud element and the second side of the oil intake element is positioned directly below a midpoint of the oil shroud element, and wherein the oil intake element has a first width that is less than a second width of the oil shroud element.

6. The assembly of claim 2, wherein the bottom of the oil intake element includes a magnet facing the inner volume.

7. The assembly of claim 1, wherein the oil shroud element includes at least one drain hole, and wherein the oil intake element includes an oil outlet positioned vertically below a terminating edge of the oil shroud element and extending at least partially past the terminating edge along a longitudinal axis of the oil intake element.

8. The assembly of claim 1, wherein the oil intake element is coupled to the oil shroud element without any seams or joints.

9. A system, comprising:
a gearbox comprising a housing enclosing at least one rotating gear, the housing having an inner surface defining a hollow interior in which the at least one rotating gear is accommodated;
a combined oil shroud and oil pickup accommodated within the hollow interior of the housing, the combined oil shroud and oil pickup including an oil shroud element shaped and sized to enclose a lower portion of the at least one rotating gear and an oil intake element accommodated within the hollow interior of the housing, the oil intake element including an oil outlet configured to couple to an inlet of a pump and an oil pickup comprising at least one orifice, the combined oil shroud and oil pickup having a shared intermediate portion that forms both a portion of a top of the oil intake element and a portion of a bottom of the oil shroud element.

10. The system of claim 9, wherein the oil intake element includes a bottom surface that faces a bottom of the inner surface of the housing and extends in a plane parallel to a plane of the bottom of the inner surface, and wherein the bottom surface of the oil intake element is positioned above the bottom of the inner surface of the housing by at least a first distance.

11. The system of claim 9, wherein the at least one rotating gear includes a first rotating gear and a second rotating gear, and wherein the oil shroud element includes a first curved portion sized and shaped to enclose a lower portion of the first rotating gear, a second curved portion sized and shaped to enclose a lower portion of the second rotating gear, and an intersecting region positioned between the first curved portion and the second curved portion.

12. The system of claim 11, wherein a top of the oil intake element includes a first top surface, a second top surface, and the shared intermediate portion positioned between the first top surface and the second top surface, wherein the shared intermediate portion forms a portion of a bottom of the second curved portion of the oil shroud element.

13. The system of claim 12, and wherein the oil pickup is cantilevered out from the bottom of the second curved portion and terminates at a position vertically below the intersecting region.

14. The system of claim 13, wherein the combined oil shroud and oil pickup further comprises a reinforcement plate coupled between the second top surface and the oil shroud element at the second curved portion and the intersecting region.

15. The system of claim 12, wherein the oil intake element extends on a first side longitudinally beyond a terminating edge of the second curved portion and the oil outlet is positioned on a front of the oil intake element at the first side, at least partially longitudinally beyond the terminating edge.

16. The system of claim 12, wherein the oil shroud element comprises a bottom, a front, and a back, each of the front of the oil shroud element and the back of the oil shroud element coupled to the bottom of the oil shroud element, the bottom of the oil shroud element having a first width from the front of the oil shroud element to the back of the oil shroud element, and wherein the oil intake element has a second width, from a front of the oil intake element to a back of the oil intake element, that is less than the first width of the bottom of the oil shroud element.

17. The system of claim 12, wherein the oil shroud element includes a first drain hole on the first curved portion and a second drain hole on the second curved portion.

18. A system, comprising:
a gearbox comprising a housing enclosing at least a first rotating gear and a second rotating gear, the first rotating gear having teeth meshed with teeth of the second rotating gear; and
an oil shroud and pickup accommodated within the housing, the oil shroud and pickup comprising:
an oil shroud element comprising a first curved portion sized and shaped to enclose a lower portion of the first rotating gear, a second curved portion sized and shaped to enclose a lower portion of the second rotating gear, and an intersecting region positioned between the first curved portion and the second curved portion, wherein each of the first curved portion, the second curved portion, and the intersecting region are aligned along a common longitudinal axis and have a common first width; and
an oil intake element accommodated within the housing and coupled to the oil shroud element directly below the second curved portion and including an oil outlet configured to couple to an inlet of a pump and an oil pickup comprising at least one orifice, and wherein the oil outlet and the oil pickup are aligned relative to the common longitudinal axis such that the oil intake element has a second width that is less than the first width.

19. The system of claim 18, wherein the oil shroud element comprises a first drain hole on the first curved portion and a second drain hole on the second curved portion, the second drain hole positioned forward of the oil intake element.

20. The system of claim 18, wherein the oil pickup is cantilevered out from a bottom of the second curved portion and terminates at a position vertically below the intersecting region, and wherein the oil shroud and pickup further comprises a reinforcement plate coupled to both of a top surface of the oil intake element and a bottom surface of the oil shroud element at the second curved portion and the intersecting region.

* * * * *